(12) United States Patent
Van Heygen (10) Patent No.: US 7,481,183 B2
(45) Date of Patent: Jan. 27, 2009

(54) VENTILATED TERRARIUM

(75) Inventor: Emmanuel Van Heygen, Mechelen (BE)

(73) Assignee: Rolf C. Hagen (USA) Corp, Mansfield, MA (US)

( * ) Notice: Subject to any disclaimer, the term of this patent is extended or adjusted under 35 U.S.C. 154(b) by 0 days.

(21) Appl. No.: 11/204,577

(22) Filed: Aug. 15, 2005

(65) Prior Publication Data

US 2006/0118057 A1 Jun. 8, 2006

Related U.S. Application Data (60) Provisional application No. 60/633,053, filed on Dec. 3, 2004.

(51) Int. Cl.
*A01K 63/00* (2006.01)
*A01G 9/02* (2006.01)

(52) U.S. Cl. .......................... 119/246; 47/69

(58) Field of Classification Search ............... 119/246, 119/248, 269, 500, 501; 47/69; 220/495.04, 220/745, 747, 913; 206/550
See application file for complete search history.

(56) References Cited

U.S. PATENT DOCUMENTS

| | | | | |
|---|---|---|---|---|
| 1,045,963 A | * | 12/1912 | Forstner | ............... 119/400 |
| 2,449,348 A | * | 9/1948 | Volgenau et al. | ............... 449/25 |
| 2,715,794 A | | 8/1955 | Atkinson | |
| 3,324,829 A | | 6/1967 | De Jose et al. | |
| 3,563,204 A | | 2/1971 | Szllagyl | |
| 3,786,781 A | | 1/1974 | Poulsen | |
| 3,791,346 A | | 2/1974 | Willinger et al. | |
| 3,804,064 A | | 4/1974 | Kuneman et al. | |
| 3,908,598 A | | 9/1975 | Jewson | |
| 4,013,044 A | * | 3/1977 | Shaw | ............... 119/500 |
| 4,086,876 A | | 5/1978 | Moore et al. | |
| 4,122,800 A | | 10/1978 | Mangarell | |
| 4,176,620 A | | 12/1979 | Kassos | |
| 4,300,478 A | | 11/1981 | Wise | |
| 4,597,220 A | * | 7/1986 | Bourrie et al. | ............... 47/19.1 |
| 4,844,016 A | | 7/1989 | Filosa | |
| 4,940,017 A | * | 7/1990 | Niki et al. | ............... 119/418 |
| 4,958,593 A | | 9/1990 | Hurlburt et al. | |

(Continued)

FOREIGN PATENT DOCUMENTS

CA 2114090 8/1994

(Continued)

*Primary Examiner*—Son T. Nguyen
(74) *Attorney, Agent, or Firm*—Wolf, Greenfield & Sacks, P.C.

(57) ABSTRACT

A terrarium having a ventilation system for preventing condensation and moisture build up is provided. The terrarium includes a bottom wall and at least one side wall coupled together to form an animal enclosure therein. A ventilation system is disposed on a portion of the side wall configured to allow air to enter into the enclosure. The ventilation system has at least one opening positioned to allow communication between the inside and the outside of the terrarium. The opening is arranged such that air entering into the enclosure through the ventilation system is directed onto the inside surface of the side wall. The terrarium may include at least one side door to access the inside of the terrarium from the side. Further, the terrarium may include a bottom frame that raises the bottom of the terrarium from the lower edge of the bottom frame so that a heater may easily be placed underneath the terrarium.

15 Claims, 10 Drawing Sheets

U.S. PATENT DOCUMENTS

| | | | | |
|---|---|---|---|---|
| 4,967,694 A | | 11/1990 | Waldman | |
| 4,995,334 A | | 2/1991 | Wechsler | |
| 5,000,118 A | | 3/1991 | Merritt et al. | |
| 5,010,845 A | | 4/1991 | Azpurua et al. | |
| 5,134,969 A | * | 8/1992 | Mason et al. | 119/472 |
| 5,135,400 A | | 8/1992 | Ramey | |
| 5,140,948 A | | 8/1992 | Roberts | |
| 5,148,768 A | | 9/1992 | Hinton | |
| 5,183,004 A | | 2/1993 | Trent et al. | |
| 5,216,977 A | | 6/1993 | Allen, Jr. | |
| 5,220,883 A | | 6/1993 | Long | |
| 5,272,316 A | | 12/1993 | Chesnut | |
| 5,289,800 A | * | 3/1994 | Walton | 119/166 |
| 5,315,964 A | | 5/1994 | Mimms et al. | |
| 5,315,965 A | | 5/1994 | Davis | |
| 5,327,855 A | | 7/1994 | Pritchard et al. | |
| 5,353,746 A | | 10/1994 | Del Rosario | |
| 5,363,801 A | * | 11/1994 | Watters et al. | 119/452 |
| 5,365,886 A | | 11/1994 | Frost, Jr. | |
| 5,385,118 A | * | 1/1995 | Coiro et al. | 119/418 |
| 5,404,839 A | | 4/1995 | Mancuso | |
| 5,404,840 A | | 4/1995 | Wiedenmann et al. | |
| 5,435,266 A | | 7/1995 | Carson | |
| 5,501,614 A | | 3/1996 | Tsuchiya | |
| 5,575,239 A | * | 11/1996 | Bradburn et al. | 119/500 |
| 5,577,464 A | | 11/1996 | Wellington et al. | |
| 5,588,396 A | | 12/1996 | Yoshida | |
| 5,597,228 A | | 1/1997 | Boyle | |
| 5,713,304 A | | 2/1998 | de Vosjoli et al. | |
| 5,878,694 A | | 3/1999 | Irwin | |
| 5,895,310 A | * | 4/1999 | Otomo et al. | 449/1 |
| 5,937,792 A | | 8/1999 | Madrid | |
| 5,950,563 A | | 9/1999 | Adcock, Jr. | |
| 5,988,108 A | | 11/1999 | Silver | |
| 6,029,604 A | | 2/2000 | de Vosjoli et al. | |
| 6,029,605 A | | 2/2000 | Licata | |
| 6,176,202 B1 | * | 1/2001 | Wood | 119/246 |
| 6,352,076 B1 | * | 3/2002 | French | 119/420 |
| 6,647,925 B1 | | 11/2003 | Waiters | |
| 6,701,871 B1 | | 3/2004 | Johnson | |
| 2002/0152969 A1 | | 10/2002 | Grigsby et al. | |

FOREIGN PATENT DOCUMENTS

ES      2017362      1/1991

* cited by examiner

VENTILATED TERRARIUM

RELATED APPLICATIONS

This application claims priority under 35 U.S.C. § 119(e) to U.S. Provisional Application Ser. No. 60/633,053, entitled "VENTILATED TERRARIUM," filed on Dec. 3, 2004, which is herein incorporated by reference in its entirety.

BACKGROUND OF INVENTION

1. Field of Invention

The present invention relates to terrariums, and in particular to a terrarium having a ventilation system to prevent condensation and moisture from building up on the terrarium walls.

2. Discussion of Related Art

Various types of terrariums are known for keeping animals, such as reptiles, amphibians and fish, etc. These terrariums typically include transparent glass or plastic walls so that one may observe the animals from outside of the terrarium. These terrariums may also include numerous types of terrarium accessories placed inside of the terrarium, such as heaters, lights, filters, waterfalls, sensors, heat rocks, etc.

For a variety of reasons, condensation and moisture may build up on the walls of a terrarium. Condensation typically occurs when the air within the terrarium is warmer and/or more moist than the air outside of the terrarium. When the inside surface of a terrarium side wall is cooler than the air temperature within the terrarium, surface condensation is likely to occur on the side wall. The condensation thus causes the terrarium walls to cloud up with moisture, making it harder to view into the terrarium. Because a terrarium heater increases the temperature in the terrarium, the use of a heater may create condensation. Animals within the terrarium may also contribute to moisture and heat generated in the terrarium which leads to surface condensation. Further, terrariums designed to have an aquatic portion with a land portion above may also create condensation since the water in the aquatic portion will likely increase the moisture content in the land portion.

It is an object of the present invention to provide a terrarium for preventing such condensation and moisture from building up on the terrarium walls. It is a further object of the present invention to provide a terrarium having an improved structure, that affords access to the inside of the terrarium from the side, and also enables a substrate heater to be easily placed under the terrarium to heat a ground surface in the terrarium. It is a further object to provide a terrarium having a unique top frame assembly.

SUMMARY OF INVENTION

In one embodiment, a terrarium is provided. The terrarium includes a bottom wall and at least one side wall coupled together to form an animal enclosure. A ventilation system is disposed on a portion of the side wall, and is configured to allow air to enter into the enclosure. The ventilation system has at least one opening positioned to communicate between the inside and outside of the terrarium. The opening is constructed and arranged such that air entering into the enclosure through the ventilation system is directed onto the inside surface of the side wall.

Another embodiment of the invention is a method of preventing moisture build up on the inside wall of a terrarium. A terrarium is provided with a bottom wall and at least one side wall coupled together to form an animal enclosure. A ventilation system is also provided on a portion of the side wall to allow cool air to enter into the enclosure. The ventilation system has at least one opening positioned inside of the terrarium shaped to direct air upwardly onto the inside surface of the side wall.

BRIEF DESCRIPTION OF DRAWINGS

Various embodiments of the invention will now be described, by way of example, with reference to the accompanying drawings, in which.

DETAILED DESCRIPTION

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

Aspects of the present invention are directed towards a terrarium having a ventilation system arranged to prevent condensation and moisture from building up on the walls of the terrarium. The ventilation system may be positioned along at least one of the walls of the terrarium to permit air to enter into the terrarium. In one embodiment of the present invention, the ventilation system is positioned to direct air entering into the terrarium through the ventilation system onto the inside surface of a side wall. This arrangement may direct cooler and/or drier air onto the inside surface of the side wall. Accordingly, the ventilation system prevents or minimizes the amount of condensation and moisture that may build up on the inside surface of the terrarium walls. In one embodiment, the condensation may be due to a heater warming the air in the terrarium. In another embodiment, heat and/or moisture generated by the animals inside of the terrarium may contribute to the condensation. In other embodiments, the condensation may be due to the terrarium having an aquatic portion and a land portion, because the aquatic portion will likely increase the moisture content of the air in the land portion of the terrarium.

Further aspects of the present invention are directed towards an improved terrarium design having a side entrance into the terrarium, having a raised portion below the terrarium for placement of a heater, and/or a terrarium having a unique top frame assembly.

It should be appreciated that the terrarium described herein is not limited for use with any particular type of animal. Thus, the terrarium may be used with any type of amphibian or reptile, such as, lizards, frogs, alligators, salamanders, etc. Further, the terrarium may be used with aquatic animals, such as various types of fish, etc. In one embodiment the terrarium of the present invention is for use with land-dwelling animals only. In another embodiment of the present invention the terrarium may be filled at least partially with water such that it can accommodate aquatic animals. In yet another embodiment, the terrarium may be designed as a paludarium, such that animals in the terrarium can dwell in both a land and a water environment.

Figure 1:
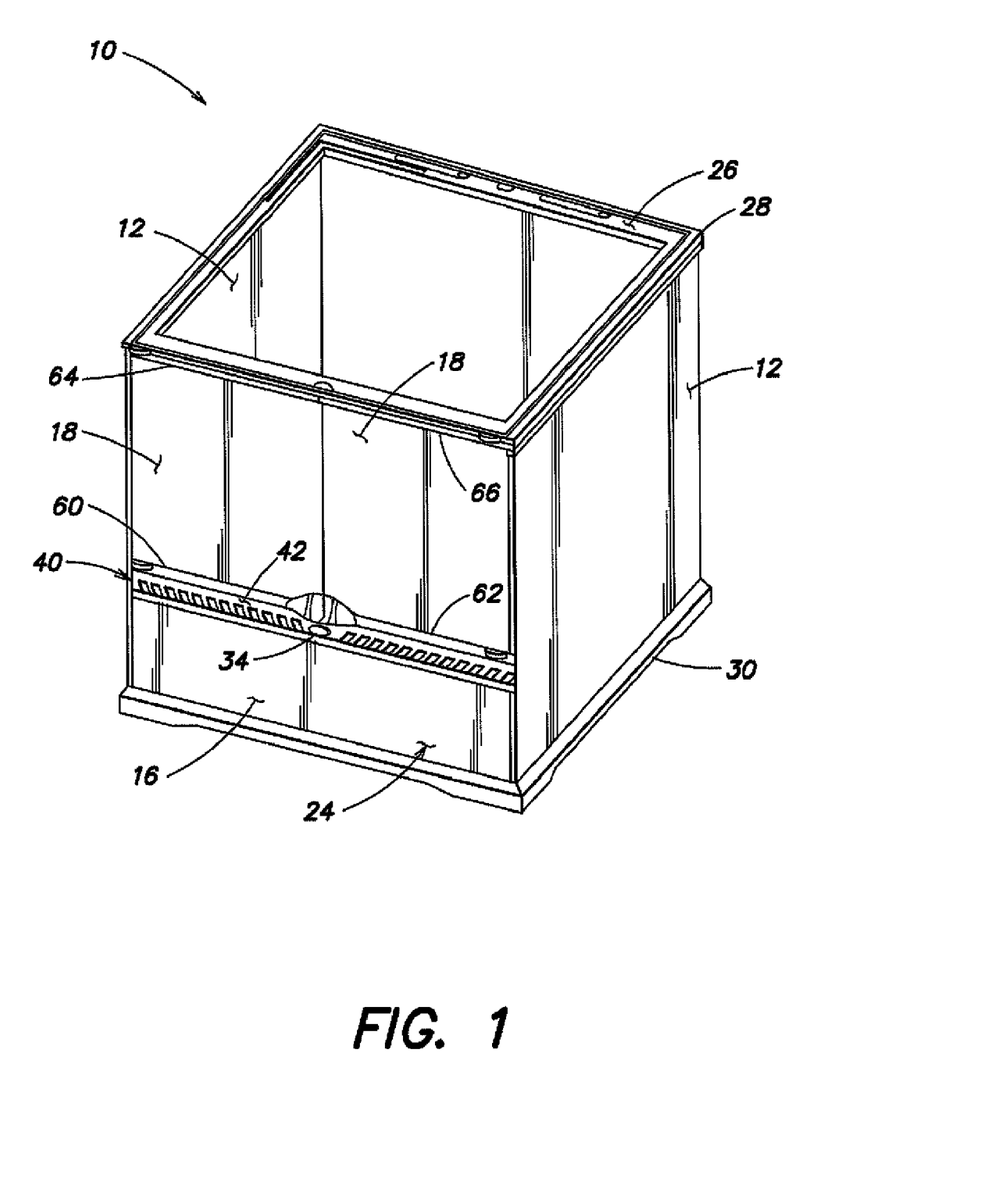
FIG. 1 is a perspective view of one embodiment of the terrarium in accordance with the present invention.
Figure 2:
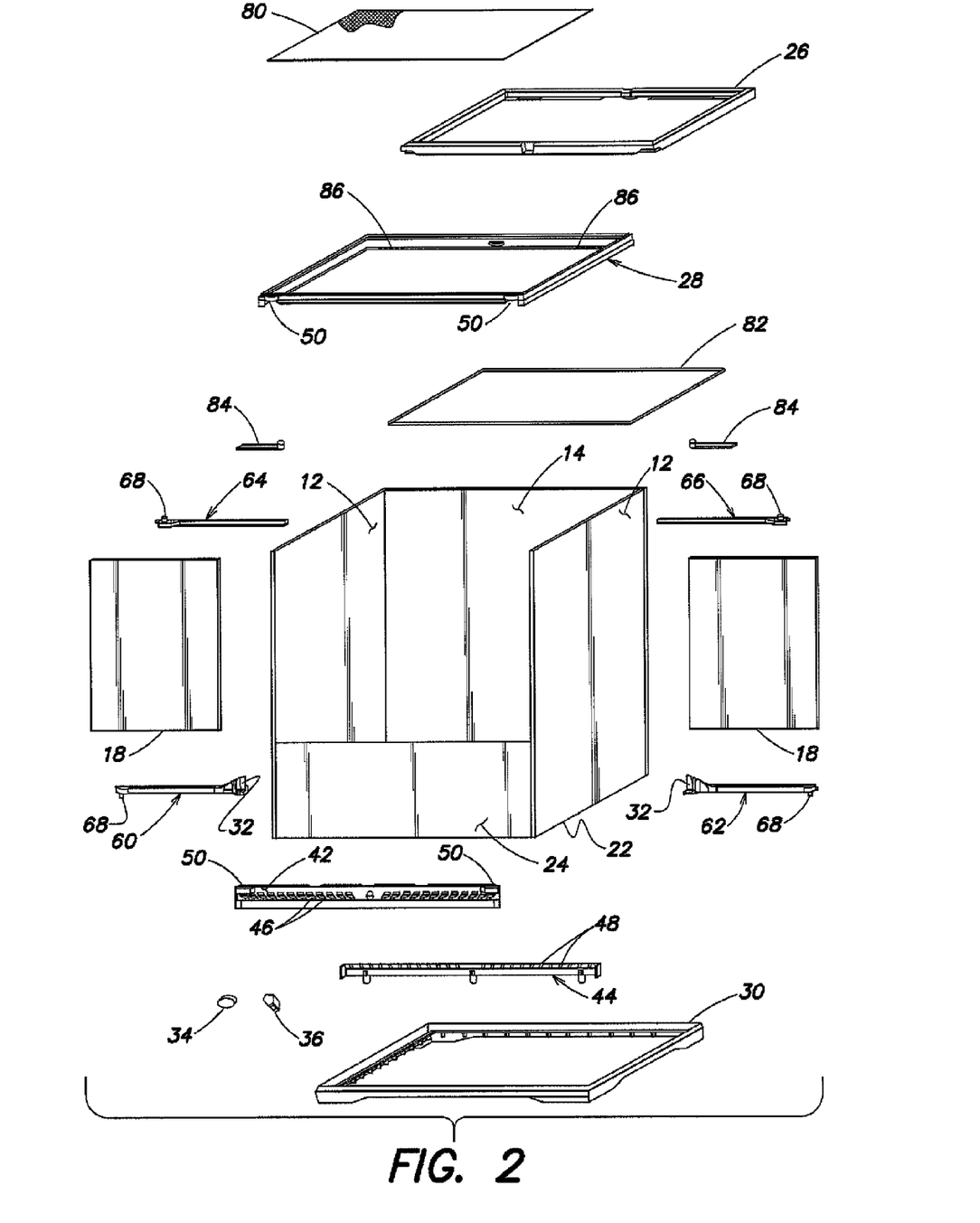
FIG. 2 is an exploded assembly view of the terrarium in FIG. 1.
Figure 3:
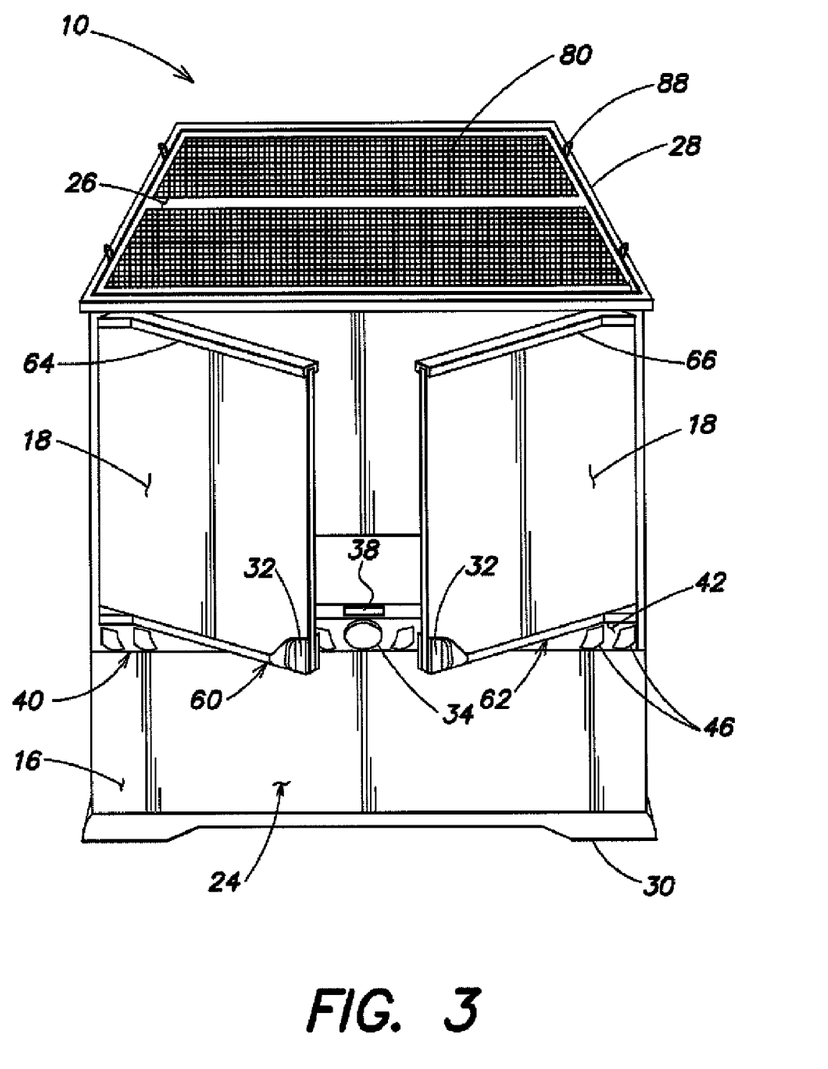
FIG. 3 is a perspective view of one embodiment of the terrarium in accordance with the present invention.

Turning now to the drawings, and in particular to FIGS. 1 and 2, the terrarium 10 according to one aspect of the present invention includes a bottom wall 22, and at least one side wall capable of forming an enclosure therein. As shown in FIGS. 1 and 2, the terrarium 10 includes a front 16 and back 14 side wall, and also left and right side walls 12. Although the terrarium in the embodiment of FIGS. 1 and 2 has a substantially rectangular shape, other shapes, including curved shapes are also contemplated in the scope of the present invention, as the present invention is not limited in this respect.

As described above, in some instances, it may be advantageous to be able to access the terrarium 10 through a side entrance as opposed to access only through the top of the terrarium. A side entrance allows easy access into the terrarium 10 for maintenance and feeding. Accordingly, side doors 18 may be provided in the terrarium 10. Although the left and right side doors 18 in FIGS. 1 and 2 substantially extend across the length of the front side wall 16, the invention is not limited in this respect. In one embodiment, a side door may only extend partially across the length of the front side wall 16, and in some embodiments, there may only be one side door 18. Further, the present invention is not limited to a certain type of door. The side doors 18 shown in FIGS. 1 and 2 are each connected to the terrarium with a hinge arrangement and both open into the middle of the terrarium. In other embodiments, however, the side doors may slide, or may pivot along a different axis, etc.

In some instances, it is desirable to be able to offset the side doors 18 from the bottom wall 22 of the terrarium 10. This may be beneficial if the terrarium has thick layers of a ground substrate for burrowing reptiles, aquatic portions to form a paludarium, or when mounting other terrarium accessories (such as the EXO TERRA® Reptile Den, by Rolf C. Hagen Corporation) on lower portions of the terrarium side walls. In FIGS. 1 and 2, the side doors 18 are offset from the bottom wall 22 with front lower wall 24 which extends across the length of the front wall 16. When this portion of the side wall and bottom wall are made from a nonporous material and are coupled together to form a water tight enclosure, a water environment may be created in the terrarium 10.

To prevent condensation and moisture from building up in the terrarium 10, a ventilation system 40 may be disposed on a portion of the side wall. The ventilation system 40 is configured to allow air to enter the enclosure. In the embodiment illustrated in FIGS. 1-7, the ventilation system includes a face profile 42 positioned on the outside of the terrarium 10, and an inner profile 44 positioned inside of the terrarium 10. The face profile 42 has a first plurality of holes or openings 46 for air to enter into, and the inner profile 44 has a second plurality of holes or openings 48 for air to flow into the terrarium. As illustrated in the embodiment of FIGS. 5 and 6, the face and inner profiles 42, 44 are shaped to form a cavity 92 between the first and second plurality of holes 46, 48. In one embodiment, the second plurality of openings 48 is constructed to direct air entering into the enclosure through the ventilation system upwardly onto the inside surface of the side wall. In other embodiments, the second plurality of openings 48 is constructed for air to be directed downwardly onto the inside surface of the side wall. As described in further detail below, such an arrangement may help to prevent condensation and moisture from building up on the inner surface of the side wall by directing cooler air onto the wall.

Although the embodiment shown in FIGS. 1-4 illustrate a plurality of openings 46 in the face profile 42 and a plurality of openings 48 in the inner profile, other designs are contemplated in the present invention. For example, in some embodiments, there may be only a single opening in either the face profile 42 or the inner profile 44, or in both. Further, although the embodiment disclosed in FIGS. 5 and 6 illustrate at least one opening in the face profile 42 that is separated by cavity 92 from the at least one opening in the inner profile 44, as described in further detail below, in one embodiment, these opening 46, 48 are connected to each other with a channel to form one opening. In such an embodiment, an opening may be formed into a channel through the thickness of a terrarium side wall. Further, although the openings 46, 48 may be described separately with respect to a face profile 42 and an inner profile 44, in one embodiment the face profile 42 and the inner profile 44 may be formed of one piece. As described below, in this embodiment, the opening 48 positioned inside of the terrarium may be part of the opening 46 positioned outside of the terrarium. Further, as set forth below, in some embodiments, the ventilation system includes only one of the face profile 42 and the inner profile 44.

When it is preferable to have a water environment region in the lower portion of the terrarium 10, it is desirable to position the ventilation system 40 in a region above the desired water level in the terrarium 10. Since the water level may fluctuate with volume displacement, it may be desirable to position the ventilation system 40 at least a few centimeters from the desired water level. However, in some embodiments it may be advantageous to position the ventilation system 40 at the bottom of the terrarium 10, near the bottom wall 22. In the embodiment disclosed in FIGS. 1 and 2, the ventilation system 40 is positioned on the front side wall 16, above the front lower wall 24, and the side doors 18 are positioned directly above the ventilation system 40.

For ease of manufacturing it may be advantageous to incorporate additional functional components of the terrarium within the ventilation system 40. As shown in FIG. 2, each side door 18 is mounted to upper and lower slides 60, 62, 64, 66. Each slide is provided with a projection or post 68 which forms part of the hinge arrangement for the door 18. To complete the hinge arrangement on the bottom part of the door 18, the posts 68 on the lower slides 60, 62 mate with a recess 50 formed on each side of the ventilation system 40.

Further, in one embodiment, the ventilation system 40 may incorporate a locking mechanism for the side doors 18. For example, as depicted in FIGS. 2-3, 8 and 9, a cam 36 is positioned within the ventilation system 40. With the turn of the lock button 34 on the face profile 42, the cam 36 protrudes through the cam opening 38 in the ventilation system 40. When the cam 36 protrudes through the opening 38, it fits within a cavity 32 located on the side door 18 to prevent the door 18 from opening. For example, in FIGS. 1-3, the cavity 32 is on the lower left and right slides 60, 62. When the button 34 is rotated to its unlock position with the cam not protruding through the cam opening 38, the doors 18 may be closed. Thereafter the lock button 34 is rotated to project the cam 36 into at least one cavity 32 on the door 18. This locking mechanism helps to prevent an animal from escaping through a side door 18. In another embodiment, other types of locking mechanisms may be used to keep the doors in a closed position, as the present invention is not limited in this respect. For example, conventional keys, latches, and other restraining devices may be implemented as the locking mechanism, portions of which may be incorporated into the ventilation system 40.

As mentioned above, each door 18 may be mounted to an upper slide 64, 66 used to attach the door 18 to the terrarium walls. Similar to the lower slides 60, 62, as shown in FIG. 2, the upper slides 64, 66 may also have posts 68 that form part of the hinge arrangement for the door. To complete the hinge arrangement on the top part of the door, the posts 68 on the upper slides 64, 66 mate with a recess 50 formed on each side of the top frame 28 of the terrarium 10. Together, the posts 68 on both the top and the bottom of each door, and their respective recesses 50, provide a hinge allowing each door 18 to pivot, opening to the middle of the terrarium 10.

In one embodiment, there is a bottom frame 30 located at the base of the terrarium 10. As shown in FIGS. 1-4, the bottom frame 30 may be constructed to raise the bottom wall 22 of the terrarium up from the lower edge of the bottom frame 30. Thus, when the terrarium 10 is placed on a planar surface, there is room below the terrarium 10 to mount a substrate heater (not shown) to heat part of the ground surface in the terrarium 10. Further, the perimeter of the bottom frame 30 is partially open on the side to provide room to easily access the heater and any associated cords and plugs once the heater is placed under the terrarium 10.

Figure 4:
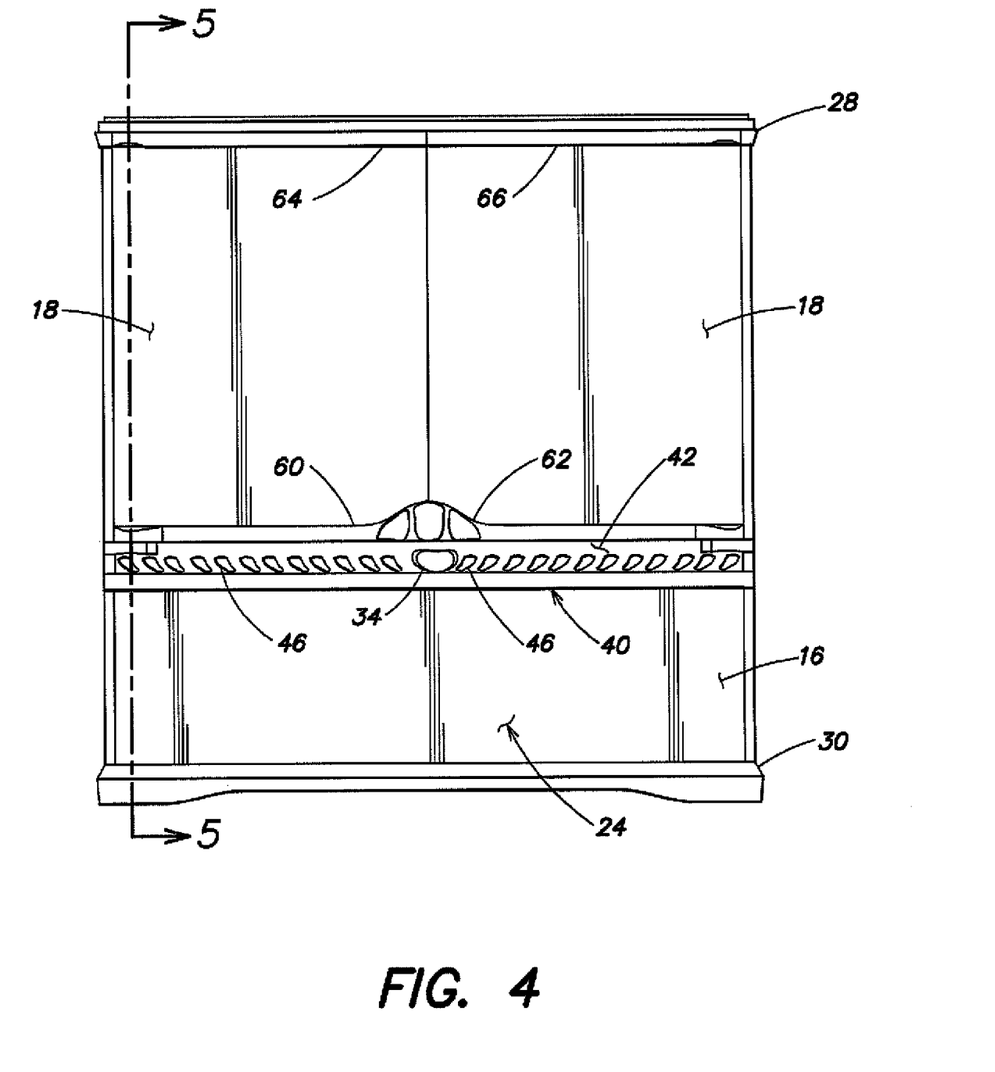
FIG. 4 is a front view of the terrarium in FIG. 1.
Figure 5:
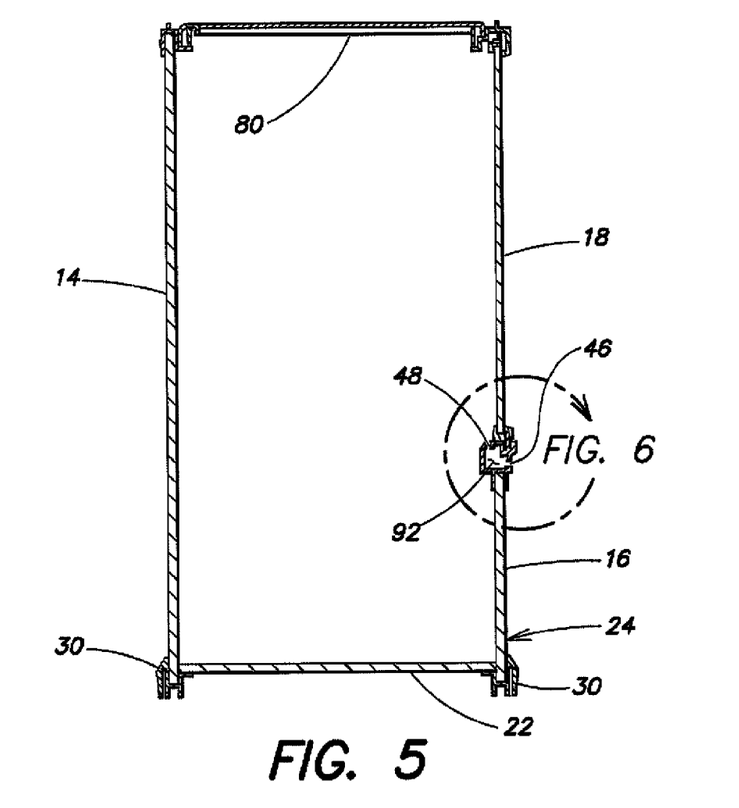
FIG. 5 is a cross-sectional view of the terrarium taken along line 5-5 of FIG. 4.
Figure 6:
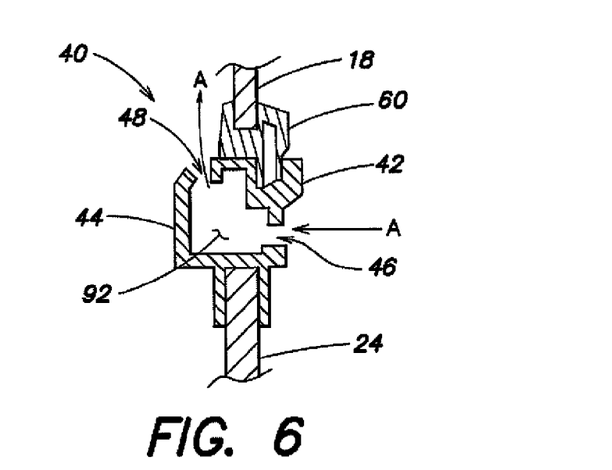
FIG. 6 is an enlarged detail view of the area encircled by arrows 6-6 in FIG. 5.

In FIGS. 4-7 additional aspects of the ventilation system 40 are shown in detail. As shown in FIG. 4, it may be preferable for the first plurality of openings 46 in the face profile 42 to extend fully across the ventilation system 40 to maximize the amount of air drawn into the terrarium 10 through the system. In the embodiment of FIG. 4, the first openings 46 extend across the width of the front wall 16 of the terrarium and are partially crescent shaped. However, other shapes, such as circles, rectangles, and ellipses are contemplated, as the present invention is not limited in this respect. For example, in one embodiment, a first opening 46 may extend substantially in a horizontal direction across the width of the ventilation system. In another embodiment, there may be a plurality of first openings 46, each extending in a substantially vertical direction, across the ventilation system. In the particular embodiment of FIG. 4, each opening 46 is approximately 1 cm in length and about 0.7 cm in width.

Figure 12:
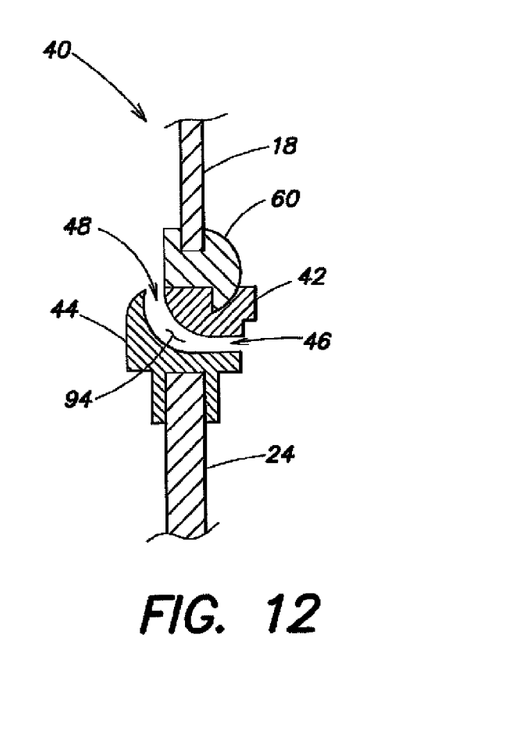
FIGS. 12-15 are enlarged detail views of alternative embodiments of the ventilation system of FIG. 6.
Figure 13:
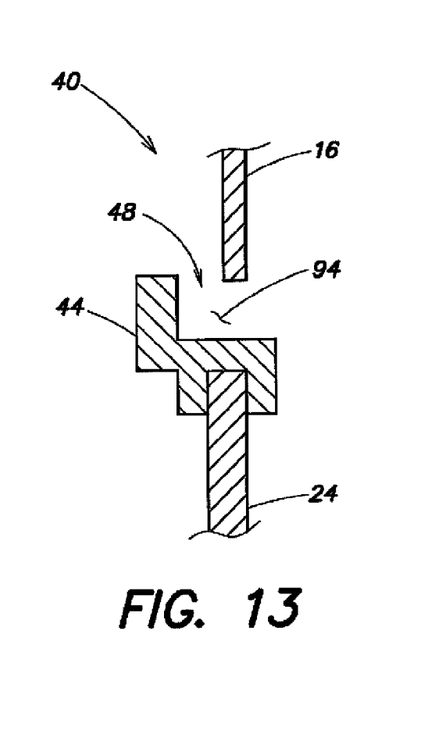
Figure 14:
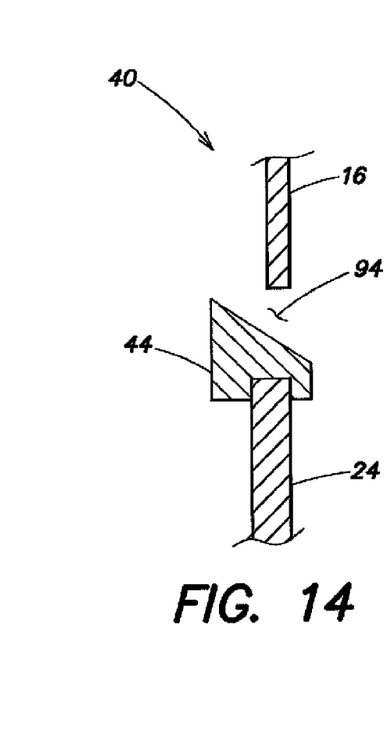
Figure 15:
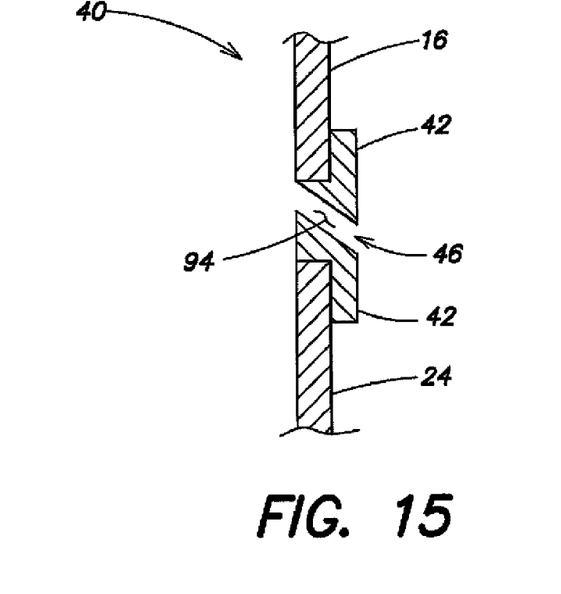

Although FIGS. 5 and 6 illustrate a ventilation system having a cavity 92 formed between the inner and outer profiles 42, 44, the present invention is not limited in this respect. Such a design may be preferred due to the ease of manufacturing, yet, alternative designs, as depicted in FIGS. 12-15 are also exemplary of the present invention. The embodiment illustrated in FIG. 12 shows a curved cavity 94 formed between the face profile 42 and the inner profile 44. FIGS. 13-15 illustrate a ventilation system 40 that is not positioned adjacent a side door 18, but rather is positioned adjacent two side wall portions. The ventilation system 40 may only include an inner profile 44, and may include an angular or linear cavity 94 as featured in FIGS. 13 and 14. In other embodiments, the ventilation system 40 may only include a face profile 42 positioned on the outside of the terrarium as shown in FIG. 15, which also depicts a linear cavity 94.

Figure 7:
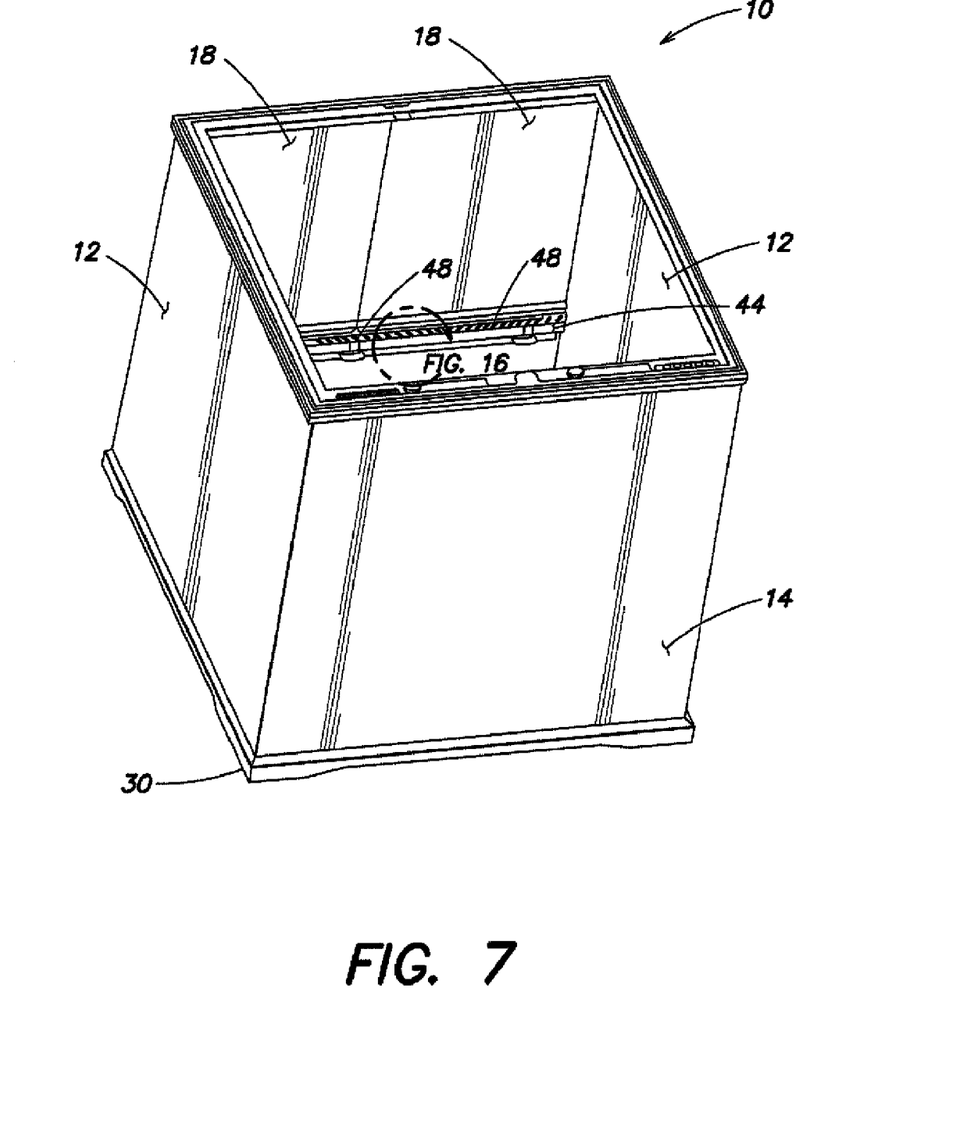
FIG. 7 is a perspective view of the terrarium in FIG. 1 viewed from the back side.
Figure 8:
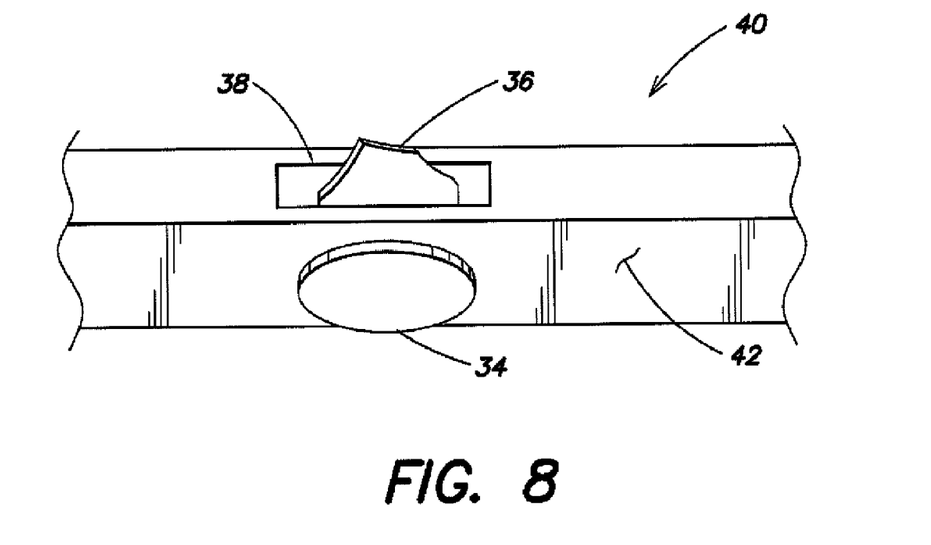
FIG. 8 is a perspective view of the lock assembly in a locked position according to one embodiment of the present invention.
Figure 9:
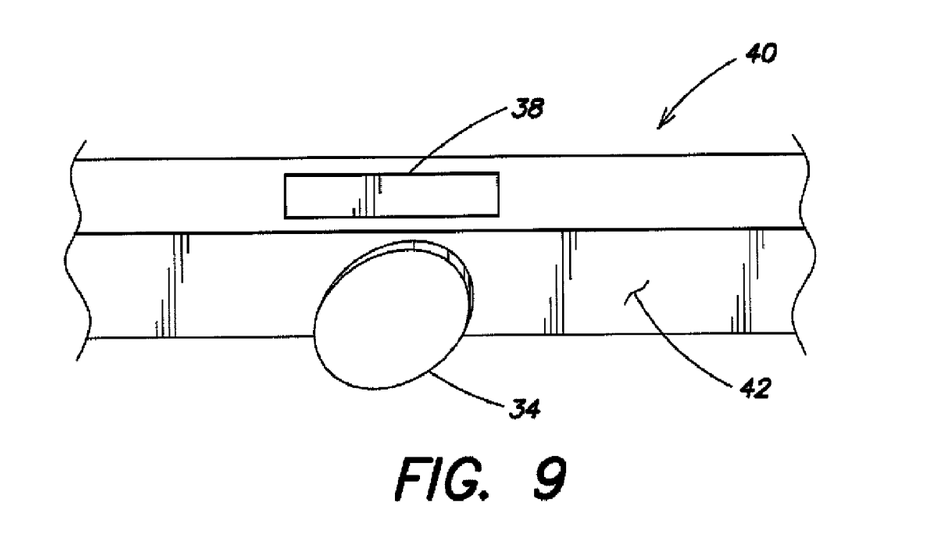
FIG. 9 is a perspective view of the lock assembly of FIG. 8 in an unlocked position.

As shown in the embodiment of FIGS. 5-7, the second plurality of openings 48 that extend inside of the terrarium 10 across the inner profile 44 of the ventilation system 40 are positioned to direct air upwardly onto the inside surface of the side wall. In one embodiment, the second openings 48 are positioned to direct air substantially parallel to the plane of the side walls. In other embodiments, the second openings 48 may be angled to the plane of the side walls. However, in order to maximize the amount of air that is directed towards the side walls, it is beneficial to design the second openings 48 such that at least a portion of the air entering the terrarium 10 through the ventilation system 40 has a vertical component. In the particular embodiment disclosed in FIGS. 5-7, the openings 48 are positioned to direct air onto the inside of the doors 18. However, in other embodiments, the openings 48 may be positioned to direct air onto the inside of other side walls, such as the left and right side walls 12, the back side wall 14, and/or other portions of the front side wall 16. Although not specifically illustrated, in some embodiments, the second plurality of openings 48 may be positioned to direct air downwardly onto the inner surface of the side walls. In one embodiment, a fan or some other type of air blowing means (not shown) may be incorporated into the ventilation system 40 to increase the volume of air circulating through the ventilation system. As described above, a design where these openings 48 are positioned to direct air onto the side walls of the terrarium 10 prevents or minimizes the amount of condensation and moisture that may build up on the side walls.

Figure 16:
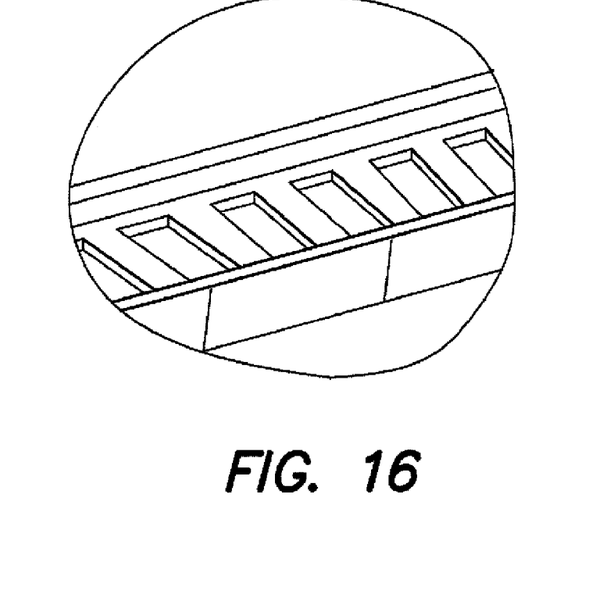
FIG. 16 is an enlarged detail view of the area encircled by arrows 16-16 in FIG. 7.

Further, in one embodiment, the second plurality of openings 48 are small, to ensure that animals within the terrarium 10 cannot escape or get caught in the openings 48. Making the second openings 48 small also generally minimizes the amount of material that can fit through the openings 48, which prevents the openings from becoming obstructed. In the embodiment shown in FIG. 7, there are a plurality of openings 48 in the inner profile 44, where each opening is approximately rectangular in shape, having a length of about 0.5 cm and a width of about 0.1 cm. As shown in FIGS. 7 and 16, the openings 48 may be angled diagonally along the inner profile 44, such that the openings on the left side of the inner profile are angled towards one side wall 12, and the openings on the right side of the inner profile are angled towards the other side wall 12.

In most embodiments, it is preferable to cover the terrarium with some type of top closure device. As shown in FIG. 2, the top of the terrarium may be closed with a screen 80 which provides additional air circulation into the terrarium. When a screen 80 is utilized and the openings 48 in the inner profile 44 are directed upwardly towards the screen 80, the design of the ventilation system 40 assists to further increase air flow into the terrarium by providing a cross flow through the terrarium between the ventilation system 40 and the screen 80. Alternatively, if at least a portion of the top of the terrarium 10 is left open (even without a screen), the design of the ventilation system 40 also provides the beneficial cross flow as well. The screen 80 may be made of a variety of types of materials, but in one embodiment the screen 80 is an ultra-fine stainless steel mesh cover, which may allow UVB and infrared penetration.

Turning back to the embodiment depicted in FIG. 2, the screen 80 is positioned within a screen frame 26, which is secured to the terrarium by attachment to the top frame 28.

The screen frame 26 may attach to the top frame 28 in any suitable manner, as the present invention is not limited in this respect. However, in the embodiment shown in FIG. 3, the screen frame 26 is provided with a plurality of latches 88 which fit into grooves (not shown) in the top frame 28.

Figure 10:
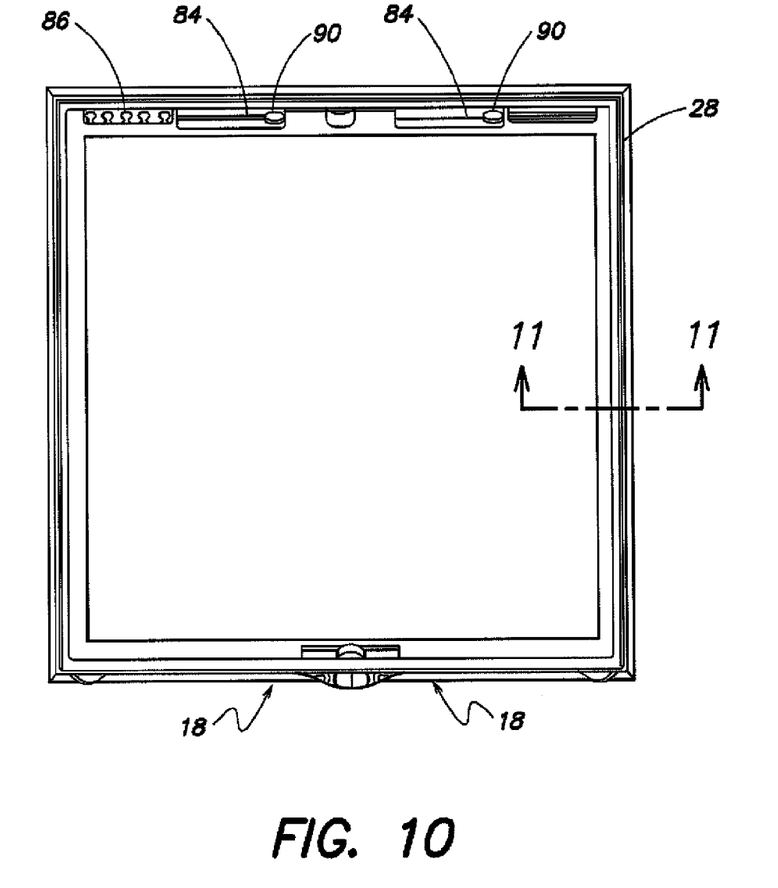
FIG. 10 is a top view of the terrarium in FIG. 1.

As shown in FIG. 10, in one embodiment, the top frame 28 includes wire holes 86 to assist in securing various cords and wires associated with the terrarium 10. These cords/wires may be used for heaters, lights, filters, waterfalls, sensors, heat rocks, and other terrarium accessories that are typically located in the terrarium 10. In one embodiment, the wire holes are formed as slots to hold a portion of each cord in place. Thus, the wire holes 86 allow the cords to extend discretely through the top frame for communication with a power supply. However, it may be desirable to cover any holes 86 which are not in use. Accordingly, in one embodiment, the top frame 28 includes a sliding wire lid 84 which is capable of covering the wire holes 86 that are not being used. In the embodiment disclosed in FIG. 10, there are two sets of wire holes 86, each including five holes for cords or wires. However, the set of holes 86 on the right portion of the terrarium are covered by a wire lid 84 which may be slid into position with the raised portion 90. Conversely, the set of holes 86 on the left portion of the terrarium are visible as the wire lid 84 is slid fully to its rightmost position. Because the wire lids 84 slide over the holes 86, the lid 84 may be used to cover any unused holes 86 to the right of any occupied holes in a set 86.

Figure 11:
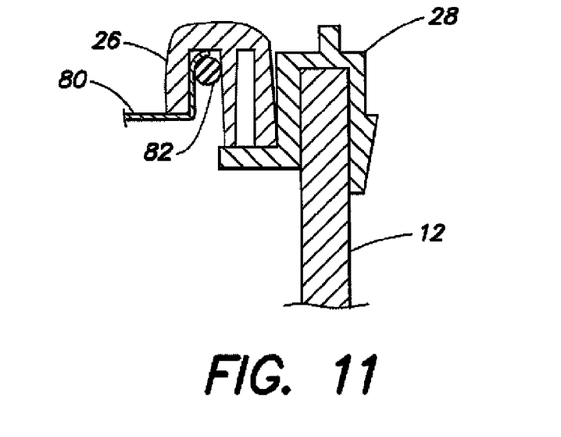
FIG. 11 is a cross-sectional view of the terrarium taken along line 11-11 of FIG. 10.

Turning to FIGS. 2, 10 and 11, in one embodiment, a seal 82 is provided within the screen frame 26 to help secure the screen 80 to the screen frame 26. As shown in FIG. 2, in one embodiment, the seal 82 is shaped to substantially follow the outer perimeter of the screen 80. As shown in FIG. 11, the seal 82 is wedged into a cavity in the screen frame 26, with the outer perimeter of the screen 80 partially wrapped around the seal 82 to secure the screen 80 to the screen frame 26. The screen frame 26 rests on top of a portion of the top frame 28 that protrudes inwardly from the side wall 12. Another portion of the top frame 28 secures the top frame 28 to the top of the side wall 12.

It should be appreciated that the terrarium described above is not limited to particular materials of construction. Thus, the terrarium components may be made of glass, plastic, mesh, wood, etc., or a combination thereof. Although in one embodiment, it may be desirable to make portions of the ventilation system 40, top frame 28, bottom frame 30, and screen frame 26 from either a plastic mold or an extruded plastic, the present invention is not limited in this respect.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. Accordingly, the foregoing description and drawings are by way of example only.

What is claimed is:

1. A terrarium comprising:
   a bottom wall;
   at least one transparent side wall, wherein said bottom wall and said at least one side wall are coupled together to form an enclosure therein;
   a ventilation system disposed on a portion of the at least one side wall, the ventilation system configured to allow air to enter into the enclosure, the ventilation system including at least one opening positioned to communicate between the inside and outside of the terrarium, wherein the ventilation system includes an inner profile positioned inside of the terrarium and, wherein at least a portion of the at least one opening is positioned within the inner profile, the inner profile including an upwardly extending projection to guide air upwardly such that air entering into the enclosure through the ventilation system is directed onto the inside surface of the at least one side wall adjacent the ventilation system;
   at least one door formed in the at least one side wall, constructed and arranged to provide an entrance into the terrarium; and
   a locking mechanism for keeping the at least one door in a closed position, wherein at least a portion of the locking mechanism is positioned within the ventilation system.

2. The terrarium of claim 1, wherein the upwardly extending projection curves inwardly towards the inside surface of the at least one side wall.

3. The terrarium of claim 1, wherein the ventilation system further comprises a face profile positioned on the outside of the terrarium, wherein at least a portion of the at least one opening is positioned within the face profile.

4. The terrarium of claim 3, wherein the face profile includes a plurality of first openings in the ventilation system positioned outside of the terrarium.

5. The terrarium of claim 4, wherein the inner profile includes a plurality of second openings in the ventilation system positioned inside of the terrarium, wherein the plurality of second openings are constructed and arranged such that air entering into the enclosure through the ventilation system is directed upwardly onto the inside surface of the at least one side wall.

6. The terrarium of claim 1, further comprising a top cover positioned opposite the bottom wall, wherein the top cover has a plurality of openings for air circulation.

7. The terrarium of claim 1, wherein the ventilation system is offset from the bottom wall, and wherein the bottom wall and the at least one side wall form an enclosure that is constructed and arranged to hold water.

8. The terrarium of claim 1, wherein the at least one door formed in the at least one side wall is offset from the bottom wall of the terrarium.

9. The terrarium of claim 1, wherein the locking mechanism includes a cam constructed and arranged to selectively protrude from the ventilation system.

10. The terrarium of claim 1, further comprising a bottom frame supporting the bottom wall of the terrarium, wherein the lower edge of the bottom wall is raised from the lower edge of the bottom frame, forming an area below the terrarium for placement of a substrate heater.

11. The terrarium of claim 1, further comprising a top frame, wherein the top frame includes a plurality of holes to retain cords extending into the terrarium, and a sliding lid to selectively cover the slots.

12. A terrarium comprising:
   a bottom wall;
   at least one transparent side wall, wherein said bottom wall and said at least one side wall are coupled together to form an enclosure therein;
   at least one side door into the terrarium; and
   a ventilation system disposed on a portion of the at least one side wall, the ventilation system configured to allow air to enter into the enclosure, the ventilation system including a face profile positioned outside of the terrarium, where the face profile has a plurality of openings for air to enter into, and an inner profile positioned inside of the terrarium, where the inner profile has a second plurality of openings for air to flow into the terrarium, with a channel within the ventilation system formed between the first plurality of openings and the second plurality of openings, wherein at least a portion of the channel adjacent the second plurality of openings is upwardly extending towards the second plurality of openings in the inner profile of the ventilation system such that air entering into the enclosure through the ventilation system is directed upwardly onto and along the inside surface of the at least one side wall adjacent the ventilation system.

13. A terrarium comprising:
a bottom wall;
at least one transparent side wall;
at least one door formed in the at least one side wall, constructed and arranged to provide an entrance into the terrarium, wherein the at least one door formed in the at least one side wall is offset from the bottom wall of the terrarium;
wherein said bottom wall, said at least one side wall, and said at least one door are coupled together to form an enclosure therein; and
a ventilation system disposed on a portion of the at least one side wall, positioned directly below the at least one door and extending substantially across the length of the at least one side wall substantially in a horizontal direction, the ventilation system configured to allow air to enter into the enclosure, the ventilation system including at least one opening positioned to communicate between the inside and outside of the terrarium, wherein the ventilation system includes an inner profile positioned inside of the terrarium and, wherein at least a portion of the at least one opening is positioned within the inner profile wherein a plane defining at least a portion of the exit of the at least one opening is not parallel with the at least one side wall adjacent the ventilation system such that air entering into the enclosure through the exit of the at least one opening in the ventilation system is directed onto the inside surface of the at least one side wall adjacent the ventilation system.

14. The terrarium of claim 13, wherein the centerline of at least a portion of the at least one opening is substantially parallel to the plane of the at least one side wall adjacent the ventilation system.

15. The terrarium of claim 13, wherein the ventilation system further comprises a face profile positioned on the outside of the terrarium, wherein at least a portion of the at least one opening is positioned within the face profile.

* * * * *